(12) United States Patent
Egilmez et al.

(10) Patent No.: US 11,582,491 B2
(45) Date of Patent: Feb. 14, 2023

(54) LOW-FREQUENCY NON-SEPARABLE TRANSFORM PROCESSING IN VIDEO CODING

(71) Applicant: QUALCOMM Incorporated, San Diego, CA (US)

(72) Inventors: Hilmi Enes Egilmez, San Diego, CA (US); Alican Nalci, La Jolla, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 17/210,918

(22) Filed: Mar. 24, 2021

(65) Prior Publication Data
US 2021/0306678 A1 Sep. 30, 2021

Related U.S. Application Data

(60) Provisional application No. 63/001,123, filed on Mar. 27, 2020.

(51) Int. Cl.
*H04N 19/96* (2014.01)
*H04N 19/169* (2014.01)
(Continued)

(52) U.S. Cl.
CPC ........... *H04N 19/96* (2014.11); *H04N 19/176* (2014.11); *H04N 19/186* (2014.11); *H04N 19/1883* (2014.11); *H04N 19/91* (2014.11)

(58) Field of Classification Search
CPC .... H04N 19/186; H04N 19/176; H04N 19/70; H04N 19/105; H04N 19/119; H04N 19/12; H04N 19/11; H04N 19/46
See application file for complete search history.

(56) References Cited

U.S. PATENT DOCUMENTS 10,306,229 B2 5/2019 Zhao et al.
10,349,085 B2 7/2019 Said et al.
(Continued)

OTHER PUBLICATIONS

Tsukuba et al. "On Interaction of LFNST and Transform Skip," JVET 17th Meeting, JVET-Q0099, Jan. 2020 (Year: 2020).*
(Continued)

*Primary Examiner* — Daniel Chang
(74) *Attorney, Agent, or Firm* — Shumaker & Sieffert, PA.

(57) ABSTRACT

An example video codec includes memory configured to store the video data and one or more processors implemented in circuitry and communicatively coupled to the memory. The one or more processors are configured to determine that a current mode of coding a current block of the video data is a single tree partitioning mode. Based on the current mode being the single tree partitioning mode, the one or more processors are configured to refrain from determining whether there is a non-DC coefficient for a chroma component of a transform unit (TU) for the current block and refrain from coding a low-frequency non-separable transformation (LFNST) index in response to the refraining of the determination of whether there is the non-DC coefficient. The one or more processors are configured to code the current block in the single partitioning mode with LFNST disabled.

20 Claims, 11 Drawing Sheets

(51) Int. Cl.
  *H04N 19/186*   (2014.01)
  *H04N 19/176*   (2014.01)
  *H04N 19/91*    (2014.01)

(56) References Cited

U.S. PATENT DOCUMENTS

| | | | |
|---|---|---|---|
| 10,448,053 | B2 | 10/2019 | Said et al. |
| 10,491,922 | B2 | 11/2019 | Zhao et al. |
| 10,863,199 | B2 | 12/2020 | Said et al. |
| 10,873,762 | B2 | 12/2020 | Zhao et al. |
| 10,986,340 | B2 | 4/2021 | Egilmez et al. |
| 11,032,572 | B2 | 6/2021 | Egilmez et al. |
| 2019/0297351 | A1 | 9/2019 | Said et al. |
| 2020/0092546 | A1* | 3/2020 | Ye .................... H04N 19/593 |
| 2020/0120334 | A1* | 4/2020 | Xu .................... H04N 19/573 |
| 2020/0260070 | A1* | 8/2020 | Yoo ................... H04N 19/103 |
| 2020/0359019 | A1* | 11/2020 | Koo .................. H04N 19/12 |
| 2020/0366937 | A1 | 11/2020 | Egilmez et al. |
| 2020/0374545 | A1* | 11/2020 | Lai ................... H04N 19/70 |
| 2021/0076070 | A1* | 3/2021 | Jung ................. H04N 19/18 |
| 2021/0099702 | A1 | 4/2021 | Egilmez et al. |
| 2021/0297700 | A1* | 9/2021 | Koo .................. H04N 19/593 |

OTHER PUBLICATIONS

Koo et al., "Separate transform skip checking of Luma and Chroma for LFNST index signaling," JVET 17th Meeting, JVET-Q0138, Jan. 2020 (Year: 2020).*

Fujimoto et al., "On constraint on DC only flag in LFNST," JVET 17th Meeting, JVET-Q0090, Jan. 2020 (Year: 2020).*

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 1. JVET Meeting, Oct. 19-21, 2015, Geneva (The Joint Video Exploration Team of ISO/IEC JTC1/SC29/WG11 and ITU-T SG.16 Wp 3), No. H.266 JVET-A1001, Feb. 24, 2016 (Feb. 24, 2016), XP030150000, 27 Pages, URL: http://phenix.int-evry.fr/vet/.

ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

Bossen F., et al., "JEM Software Manual", Joint Collaborative Team on Video Coding (JCT-VC) of ITU-T SG16 WP3 and ISO/IEC JTC1/SC29/WG11, Document: JCTVC—Software Manual, Retrieved on Aug. 3, 2016, pp. 1-29.

Bross B., et al., "Versatile Video Coding (Draft 6)", 127th MPEG,15th JVET Meeting, Jul. 3, 2019-Jul. 12, 2019, Gothenburg, SE (Motion Picture Expert Group or JVET of ISO/IEC JTC1/SC29/WG11 and ITU-T Sg 16 WP 3), No. m49908, JVET-O2001-vE, Jul. 15, 2019, XP030208568, 455 Pages, Retrieved from the Internet: URL:http://phenix.int-evry.fr/mpeg/doc_end_user/documents/127_Gothenburg/wg11/m49908-JVET-O2001-v8-JVET-O2001-v8.zip, CE5-related-6-tap-CC-ALF-JVET-O2001-vE-dO.doc.

Bross B., et al., "Versatile Video Coding (Draft 7)", 16. JVET Meeting, Oct. 1, 2019-Oct. 11, 2019, Geneva, CH (The Joint Video Exploration Team of ISO/IEC JTC1/SC29/WG11 and ITU-T SG. 16), No. JVET-P2001, m51515, Nov. 14, 2019, XP030224328, 494 Pages, Retrieved from the Internet: URL: http://phenix.int-evry.fr/jvet/doc_end_user/documents/16_Geneva/wg11/JVET-P2001-v14.zip JVET-P2001-vE.docx, JVET-P2001-vC.docx.

Bross B., et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7, 2020-Jan. 17, 2020, Document: JVET-Q2001-vE, No. JVET-Q2001, m52905, Jan. 22, 2020, XP030285390, 515 pages, Retrieved from the Internet: URL: http://phenix.int-evry.fr/jvet/doc_end_user/documents/17_Brussels/wg11/JVET-Q2001-v15.zip JVET-Q2001-vE.docx the whole document.

Chiang M-S., et al., "LFNST Signalling Cleanup with TS Checking", 17. JVET Meeting; Jan. 7, 2020-Jan. 17, 2020; Brussels; BE (The Joint Video Exploration Team of ISO/IEC JTC1/SC29/WG11 and ITU-T SG.16), No. JVET-Q0193-v1; m51782, Dec. 31, 2019 (Dec. 31, 2019), 10 Pages, XP030222858, Retrieved from the Internet: URL: http://phenix.int-evry.fr/jvet/doc_end_user/documents/17_Brussels/wg11/JVET-Q0193-v1.zipJVET-Q0193-v1.docx [retrieved on Dec. 31, 2019] Abstract; Introduction and Proposed methods; p. 1-p. 2.

Egilmez H.E., et al., "Combination of JVET-Q0106, JVET-0686 and JVET-Q0133 for LFNST Signaling, Latency Reduction and Scaling Process", JVET-Q0784-v5, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-6.

Egilmez (QUALCOMM) H E., et al., "Latency Reduction in Transformation Process with TU-Level Signalling", 130th MPEG Meeting, Apr. 20, 2020-Apr. 24, 2020, Alpbach, (Motion Picture Expert Group or ISO/IEC JTC1/SC29/WG11), No. m53213, 18th JVET Meeting, Apr. 15, 2020-Apr. 24, 2020, JVET-R0236-v1, ITU-T SG 16 WP 3 and ISO/IEC JTC 1/SC 29/WG 11, Apr. 3, 2020, XP030286250, pp. 1-8, Retrieved from the Internet: URL: http://phenix.int-evry.fr/mpeg/coc_end_user/documents/130_Alpbach/wg11/m53213-JVET-R0236-v1-JVET-R0236-v1.zip. JVET-R0236-v1.docx.

Egilmez (QUALCOMM) H.E., et al., "Chroma LFNST Simplification and Signaling", 17. JVET Meeting; Jan. 7, 2020-Jan. 17, 2020; Brussels; BE; (The Joint Video Exploration Team of ISO/IEC JTC1/SC29/WG11 and ITU-T SG.16), No. JVET-Q0686-v4; m52649, Jan. 13, 2020, 5 Pages, XP030224057, Retrieved from the Internet: URL: http://phenix.int-evry.fr/jvet/doc_end_user/documents/17_Brussels/wg11/JVET-Q0686-v4.zip JVET-Q0686_v4_clean.docx.

Egilmez (QUALCOMM) H.E., et al., "Removal of Redundant LFNST Index Signalling", 18th Meeting: by teleconference, Apr. 15-24, 2020, 130. MPEG Meeting; Apr. 20, 2020-Apr. 24, 2020; Alpbach; (Motion Picture Expert Group or ISO/IEC JTC1/SC29/WG11), No. m53211; JVET-R0234-v2, Apr. 9, 2020, 4 Pages, XP030286246, Retrieved from the Internet: URL: http://phenix.int-evry.fr/mpeg/doc_end_user/documents/130_Alpbach/wg11/m53211-JVET-R0234-v2-JVET-R0234-v2.zip JVET-R0234-v2.docx.

Hashimoto T., et al., "Fix on LFNST Condition", JVET-Q0133, Joint Video Experts Team (JVET) of ITU-T SG 16 WP 3 and ISO/IEC JTC 1/SC 29/WG 11, 17th Meeting, Brussels, BE, Jan. 7-17, 2020, No. JVET-Q0133; m51722, Dec. 27, 2019, XP030222666, Retrieved from the Internet: URL: http://phenix.int-evry.fr/jvet/doc_end_user/documents/17_Brussels/wg11/JVET-Q0133-v1.zip JVET-Q0133/JVET-Q0133.docx.

Heng B., et al., "AHG16: Combination of LFNST with Transform Skip", JVET-Q0106-v1, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-4.

International Search Report and Written Opinion—PCT/US2021/024168—ISA/EPO—dated Jun. 9, 2021, 17 pp.

Koo (LGE) M., et al., "Alternative Methods of LFNST Index Signalling", 18th Meeting: by teleconference, Apr. 15-24, 2020, 130. MPEG Meeting; Apr. 20, 2020-Apr. 24, 2020; Alpbach; (Motion Picture Expert Group or ISO/IEC JTC1/SC29/WG11), No. m53302; JVET-R0318-v3, Apr. 14, 2020, 14 Pages, XP030286479, Retrieved from the Internet: URL: http://phenix.int-evry.fr/mpeg/doc_end_user/documents/130_Alpbach/wg11/m53302-JVET-R0318-v3-JVET-R0318-v3.zip JVET-R0318-v3/JVET-R0318-v3.docx.

Koo (LGE) M., et al., "CE6: Reduced Secondary Transform (RST) (CE6-3.1)", 14th JVET Meeting, Mar. 19, 2019-Mar. 27, 2019, Geneva, CH (The Joint Video Exploration Team of ISO/IEC JTC1/SC29/WG11 and ITU-T SG.16 WP 3), No. JVET-N0193, Mar. 27, 2019, XP030256927, pp. 1-19, Retrieved from the Internet: URL: http://phenix.int-evry.fr/vet/doc_end_user/documents/14_Geneva/wg11/JVET-N0193-v5.zip JVET-N0193 r3.docx.

Bossen F., et al., "JVET Common Test Conditions and Software Reference Configurations for SDR Video", Joint Video Experts Team (JVET) of ITU-T SG 16 WP 3 and ISO/IEC JTC 1/SC 29/WG 11, 14th Meeting, Geneva, CH, Mar. 19-27, 2019, JVET-N1010-v1, pp. 1-6.

(56) References Cited

OTHER PUBLICATIONS

Chen J., et al., "Algorithm Description for Versatile Video Coding and Test Model 8 (VTM 8)", JVET-Q2002-v1, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-94.

Egilmez H.E., et al., "Removal of LFNST for Chroma Components", JVET-R0235-v1, Joint Video Experts Team (JVET) of ITU-T SG 16 WP 3 and ISO/IEC JTC 1/SC 29/WG 11, 18th Meeting: by teleconference, Apr. 15-24, 2020, pp. 1-5.

* cited by examiner

LOW-FREQUENCY NON-SEPARABLE TRANSFORM PROCESSING IN VIDEO CODING

This patent application claims the benefit of U.S. Provisional Patent Application No. 63/001,123, filed Mar. 27, 2020, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for low-frequency non-separable transform (LFNST) coding in video coding. This disclosure describes techniques including a removal of unnecessary checking to determine if there are non-DC coefficients of a chroma component of a transform unit (TU) and removal of unnecessary signaling that may be present in low-frequency non-separable transform (LFNST) signaling. This removal of unnecessary checking and unnecessary signaling may improve (e.g., reduce) processing power and signaling overhead. The techniques of this disclosure can also be used in the Versatile Video Coding (VVC) standard currently under development or other advanced video codecs, including extensions of High Efficiency Video Coding (HEVC). The techniques of this disclosure may be applicable to the next generation of video coding standards and to other video standards.

In one example, a method includes determining that a current mode of coding a current block of the video data is a single tree partitioning mode, based on the current mode being the single tree partitioning mode: refraining from determining whether there is a non-DC coefficient for a chroma component of a transform unit (TU) for the current block; and refraining from coding a low-frequency non-separable transformation (LFNST) index in response to the refraining of the determination of whether there is the non-DC coefficient; and coding the current block in the single partitioning mode with LFNST disabled.

In another example, a device includes memory configured to store the video data, and one or more processors implemented in circuitry and communicatively coupled to the memory, the one or more processors being configured to: determine that a current mode of coding a current block of the video data is a single tree partitioning mode; based on the current mode being the single tree partitioning mode: refrain from determining whether there is a non-DC coefficient for a chroma component of a transform unit (TU) for the current block; and refrain from coding a low-frequency non-separable transformation (LFNST) index in response to the refraining of the determination of whether there is the non-DC coefficient; and code the current block in the single partitioning mode with LFNST disabled.

In another example, a computer-readable storage medium is encoded with instructions which, when executed, cause one or more processors to determine that a current mode of coding a current block of video data is a single tree partitioning mode, based on the current mode being the single tree partitioning mode: refrain from determining whether there is a non-DC coefficient for a chroma component of a transform unit (TU) for the current block; and refrain from coding a low-frequency non-separable transformation (LFNST) index in response to the refraining of the determination of whether there is the non-DC coefficient; and code the current block in the single partitioning mode with LFNST disabled.

In another example, a device includes means for determining that a current mode of coding a current block of the video data is a single tree partitioning mode, based on the current mode being the single tree partitioning mode: means for refraining from determining whether there is a non-DC coefficient for a chroma component of a transform unit (TU) for the current block; and means for refraining from coding a low-frequency non-separable transformation (LFNST) index in response to the refraining of the determination of whether there is the non-DC coefficient; and means for coding the current block in the single partitioning mode with LFNST disabled.

The details of one or more examples are set forth in the accompanying drawings and the description below. Other features, objects, and advantages will be apparent from the description, drawings, and claims.

BRIEF DESCRIPTION OF DRAWINGS

FIG. 7 is a conceptual diagram of a 4×4 inverse LFNST used to reconstruct 16 intermediate coefficients from a list of 16 input coefficients.

FIG. 8 is a conceptual diagram of an 8×8 inverse LFNST used to reconstruct 48 intermediate coefficients form a list of 16 input coefficients.

DETAILED DESCRIPTION

In some techniques, a video encoder may check to determine whether a chroma component of a transform unit (TU) contains non-DC components and signal a low-frequency non-separable transform (LFNST) index when a chroma component of a transform unit contains non-DC coefficients in single tree partitioning mode. However, LFNST may be disabled for chroma components in single tree mode. According to the techniques of this disclosure, a video codec may avoid unnecessary checking and signaling by determining whether single tree partitioning mode is used. If single tree partitioning mode is used, the video codec may refrain from checking whether a chroma component of a TU has non-DC coefficients to reduce processing power. Additionally, if single tree partition mode is used, a video encoder may reduce signaling overhead by not signaling an LFNST index if there are no non-DC coefficients for a luma component of the TU in a single tree partitioning mode.

For instance, there may be no need for the video encoder to determine whether there are any non-DC coefficients for the chroma component of a block coded using single tree partitioning mode because LFNST is disabled for chroma in single tree partitioning mode. Additionally, there may be no need to signal an LFNST index if there are no non-DC coefficients for a luma component of the block even if there are non-DC coefficients for the chroma component, as LFNST may be disabled for chroma components in single tree partitioning mode. In this way, the example techniques reduce signaling overhead and processing power utilized for checking if non-DC coefficients are present in single tree partitioning mode.

Figure 1:
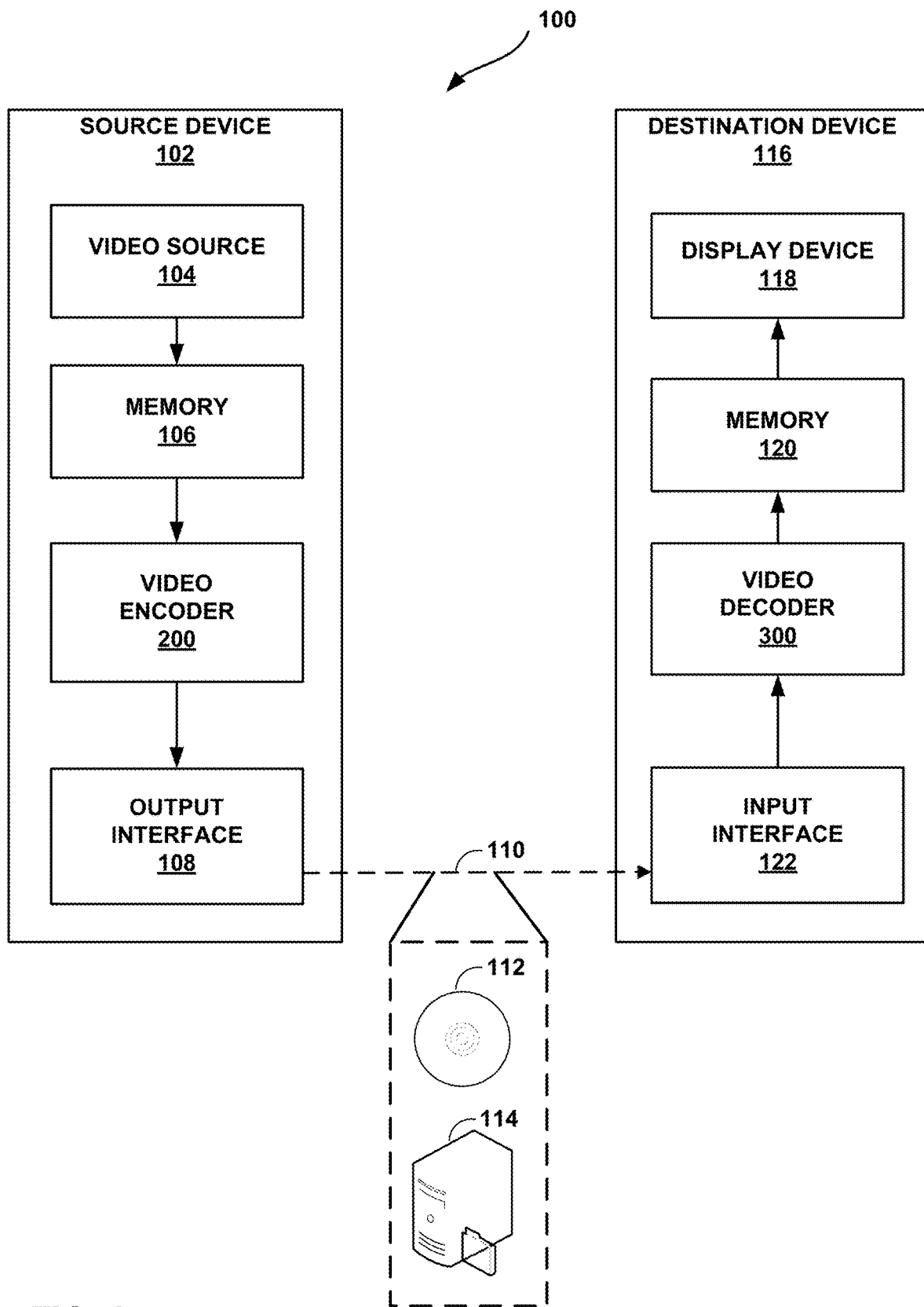
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, encoding and decoding system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for LFNST checking and signaling. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

Encoding and decoding system 100 as shown in FIG. 1 is merely one example. In general, any digital video encoding and/or decoding device may perform techniques for LFNST checking and signaling. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, encoding and decoding system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-vE (hereinafter "VVC Draft 8"). The techniques of this disclosure, however, are not limited to any particular coding standard.

As described above, the disclosure describes techniques related to low-frequency non-separable transform, but the example techniques may be applicable to other types of transforms as well. In one or more examples, this disclosure describes techniques that may remove unnecessary checking and signaling in VVC Draft 8. In this way, the example techniques may provide a technical solution to a technical problem that provides a practical application rooted in the technology of video coding.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As mentioned above, according to some techniques, video encoder 200 or video decoder 300 may check to determine whether a chroma component of a TU contains non-DC components and signal an LFNST index when a chroma component of a transform unit contains non-DC coefficients in single tree partitioning mode. However, LFNST may be disabled for chroma components in single tree mode. According to the techniques of this disclosure, a video codec may avoid unnecessary checking and signaling by determining whether single tree partitioning mode is used. If single tree partitioning mode is used, video encoder 200 or video decoder 300 may refrain from checking whether a chroma component of a TU has non-DC coefficients to reduce processing power. Additionally, if single tree partition mode is used, video encoder 200 may reduce signaling overhead by not signaling an LFNST index if there are no non-DC coefficients for a luma component of the TU in a single tree partitioning mode.

In accordance with the techniques of this disclosure, a method includes determining that a current mode of coding a current block of the video data is a single tree partitioning mode, based on the current mode being the single tree partitioning mode: refraining from determining whether there is a non-DC coefficient for a chroma component of a transform unit (TU) for the current block; and refraining from coding a low-frequency non-separable transformation (LFNST) index in response to the refraining of the determination of whether there is the non-DC coefficient; and coding the current block in the single partitioning mode with LFNST disabled.

In accordance with the techniques of this disclosure, a device includes memory configured to store the video data, and one or more processors implemented in circuitry and communicatively coupled to the memory, the one or more processors being configured to: determine that a current mode of coding a current block of the video data is a single tree partitioning mode; based on the current mode being the single tree partitioning mode: refrain from determining whether there is a non-DC coefficient for a chroma component of a transform unit (TU) for the current block; and refrain from coding a low-frequency non-separable transformation (LFNST) index in response to the refraining of the determination of whether there is the non-DC coefficient; and code the current block in the single partitioning mode with LFNST disabled.

In accordance with the techniques of this disclosure, a device includes means for determining that a current mode of coding a current block of the video data is a single tree partitioning mode, based on the current mode being the single tree partitioning mode: means for refraining from determining whether there is a non-DC coefficient for a chroma component of a transform unit (TU) for the current block; and means for refraining from coding a low-frequency non-separable transformation (LFNST) index in response to the refraining of the determination of whether there is the non-DC coefficient; and means for coding the current block in the single partitioning mode with LFNST disabled.

In accordance with the techniques of this disclosure, a computer-readable storage medium is encoded with instructions which, when executed, cause one or more processors to determine that a current mode of coding a current block of video data is a single tree partitioning mode, based on the current mode being the single tree partitioning mode: refrain from determining whether there is a non-DC coefficient for a chroma component of a transform unit (TU) for the current block; and refrain from coding a low-frequency non-separable transformation (LFNST) index in response to the refraining of the determination of whether there is the non-DC coefficient; and code the current block in the single partitioning mode with LFNST disabled.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
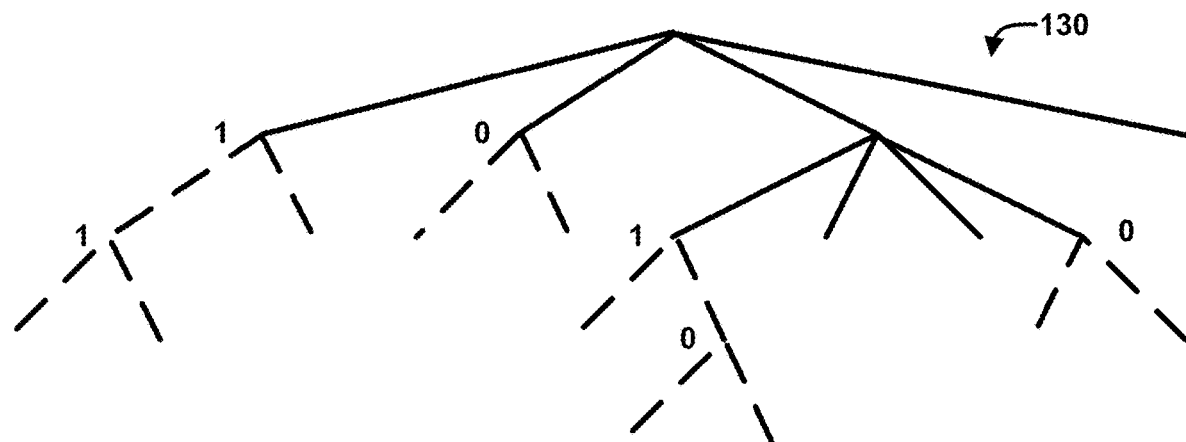
FIGS. 2A and 2B are conceptual diagrams illustrating an example quadtree binary tree (QTBT) structure, and a corresponding coding tree unit (CTU).
Figure 2B:
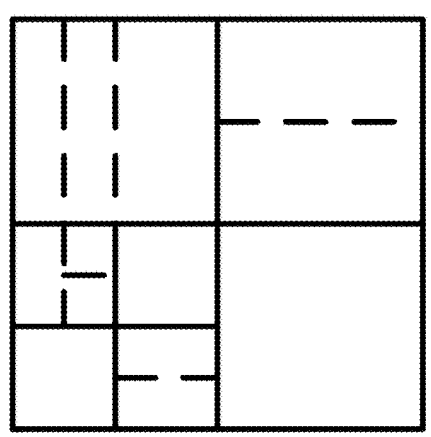

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs, and are further processed according to prediction and transform without further partitioning.

Figure 3:
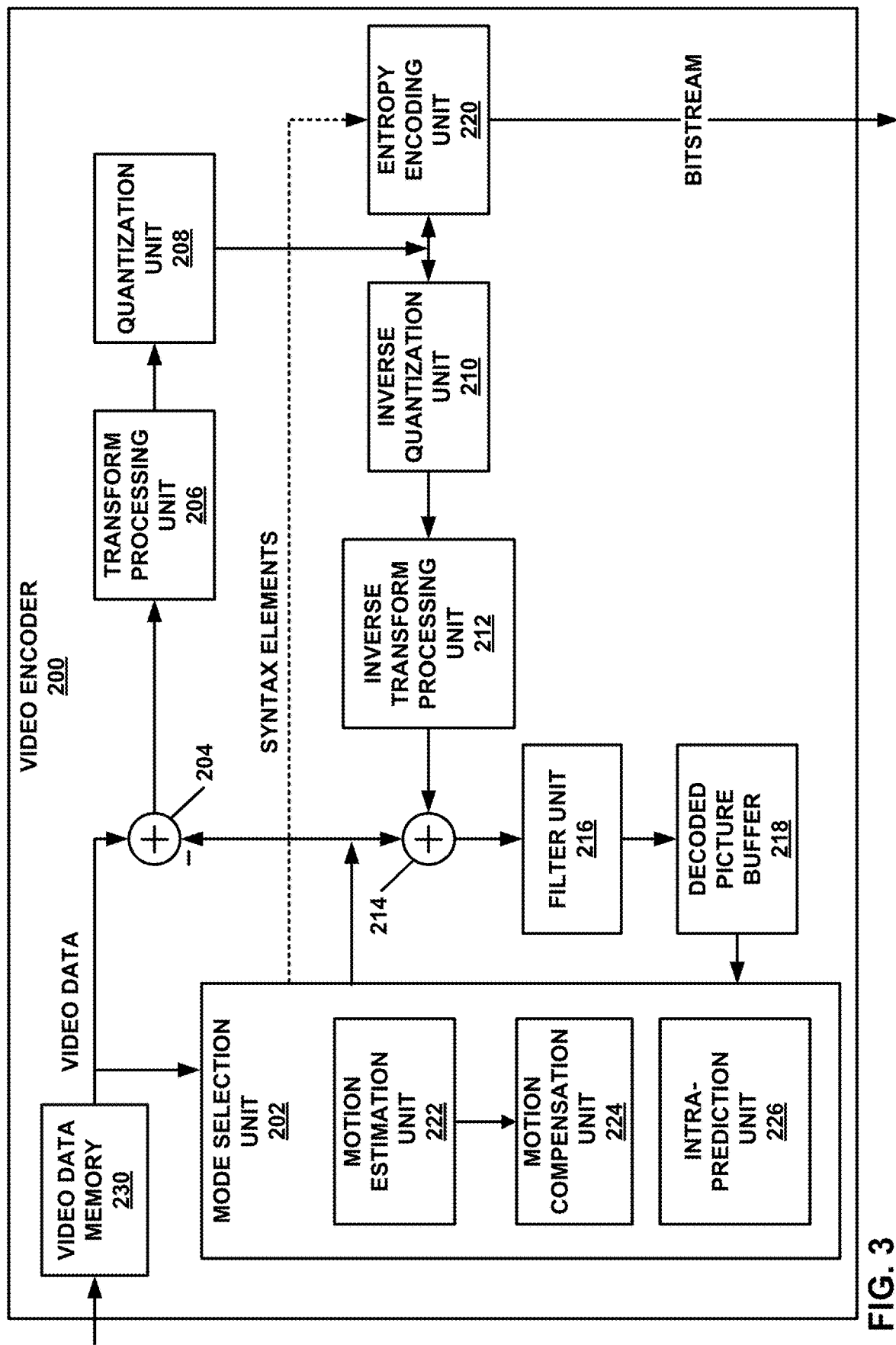
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 may apply an LFNST. In some examples, according to the techniques of this disclosure, when a current mode of coding a current block of video data is single tree partitioning mode, transform processing unit 206 may refrain from determining whether there is a non-DC coefficient for a chroma component of a TU for the current block. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

As mentioned above, according to some techniques, video encoder 200 may check to determine whether a chroma component of a TU contains non-DC components and signal an LFNST index when a chroma component of a transform unit contains non-DC coefficients in single tree partitioning mode. However, LFNST may be disabled for chroma components in single tree mode. According to the techniques of this disclosure, a video codec may avoid unnecessary checking and signaling by determining whether single tree partitioning mode is used. If single tree partitioning mode is used, video encoder 200 may refrain from checking whether a chroma component of a TU has non-DC coefficients to reduce processing power. Additionally, if single tree partition mode is used, video encoder 200 may reduce signaling overhead by not signaling an LFNST index if there are no non-DC coefficients for a luma component of the TU in a single tree partitioning mode.

According to the techniques of this disclosure, video encoder 200 represents an example of a device configured to encode video data including memory configured to store the video data, and one or more processors implemented in circuitry and communicatively coupled to the memory, the one or more processors being configured to: determine whether a current mode of coding a current block of the video data is a single tree partitioning mode; based on the current mode being the single tree partitioning mode, refrain from determining whether there is a non-DC coefficient for a chroma component of a TU for the current block; and encode the current block based on the current mode.

Figure 4:
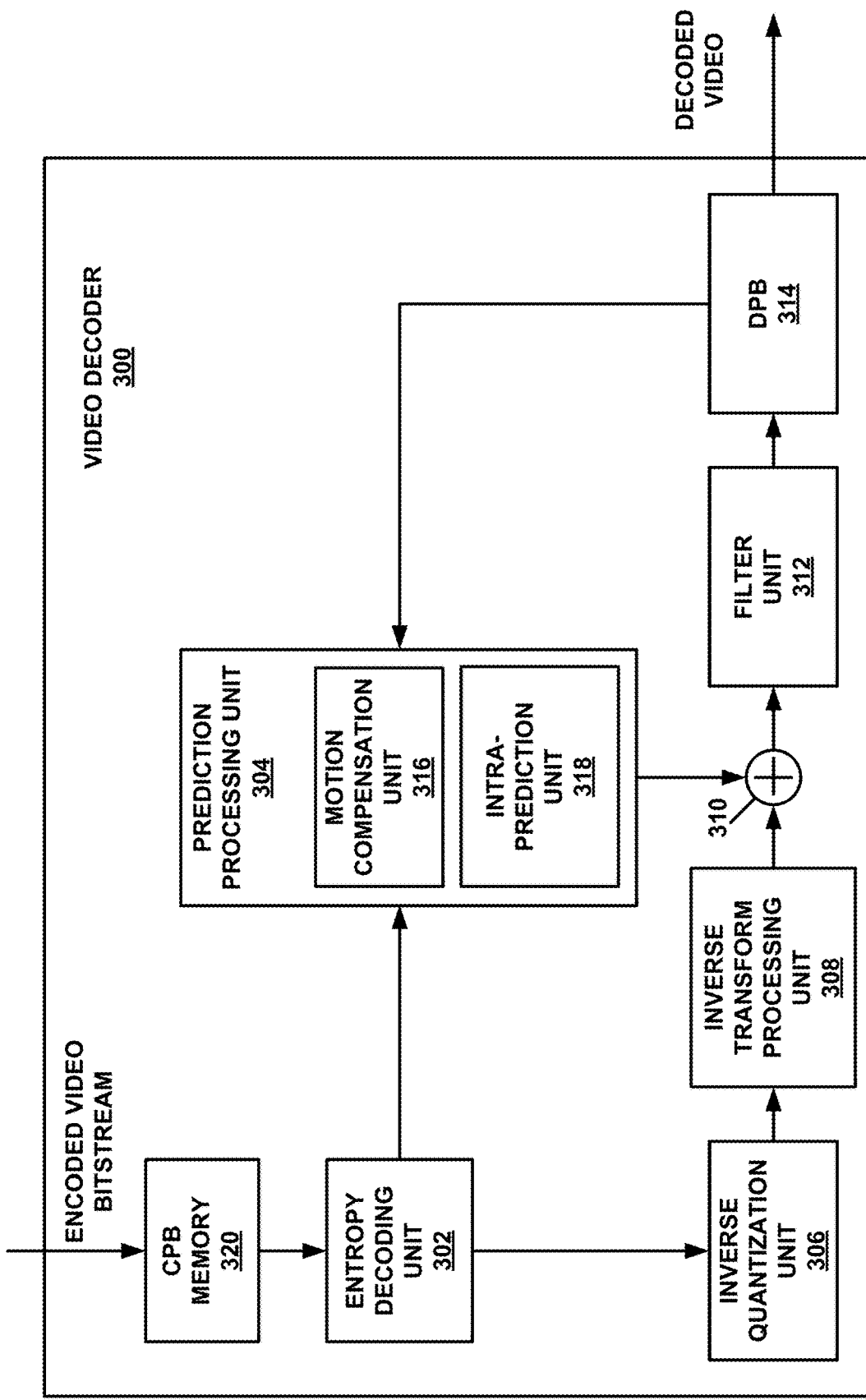
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients. After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block. In some examples, inverse transform processing unit 308 may apply an inverse LFNST. In some examples, according to the techniques of this disclosure, when the current mode of coding a current block of the video data is a single tree partitioning mode, inverse transform processing unit 308 may refrain from determining whether there is a non-DC coefficient for a chroma component of a TU for the current block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

As mentioned above, according to some techniques, video decoder 300 may check to determine whether a chroma component of a TU contains non-DC components and signal an LFNST index when a chroma component of a transform unit contains non-DC coefficients in single tree partitioning mode. However, LFNST may be disabled for chroma components in single tree mode. According to the techniques of this disclosure, a video codec may avoid unnecessary checking and signaling by determining whether single tree partitioning mode is used. If single tree partitioning mode is used, video decoder 300 may refrain from checking whether a chroma component of a TU has non-DC coefficients to reduce processing power.

In this manner, video decoder 300 represents an example of a video decoding device including memory configured to store the video data, and one or more processors implemented in circuitry and communicatively coupled to the memory, the one or more processors being configured to: determine whether a current mode of coding a current block of the video data is a single tree partitioning mode; based on the current mode being the single tree partitioning mode, refrain from determining whether there is a non-DC coefficient for a chroma component of a TU for the current block; and decode the current block based on the current mode.

In video coding standards prior to HEVC, only a fixed separable transform, e.g., a DCT-2, was applied, both vertically and horizontally, to transform blocks of video data. In HEVC, in addition to a DCT-2, a DST-7 was also employed for 4×4 blocks as a fixed separable transform.

The following U.S. patent and co-pending U.S. patent application describe multiple transform selection (MTS) techniques: U.S. Pat. No. 10,306,229, issued on May 28, 2019, and U.S. patent application Ser. No. 16/426,749, filed May 30, 2019. MTS was previously called Adaptive Multiple Transformations (AMT). MTS techniques are generally the same as previously-described AMT techniques. An example of MTS described in U.S. patent application Ser. No. 16/426,749, filed May 30, 2019, has been adopted in the Joint Experimental Model (JEM-7.0) of the Joint Video Experts Team (JVET) (See Joint Video Experts Team (JVET) of ITU-T SG 16 WP 3 and ISO/IEC JTC 1/SC 29/WG 11, JEM Software), and later a simplified version of MTS is adopted in VVC.

Figure 5:
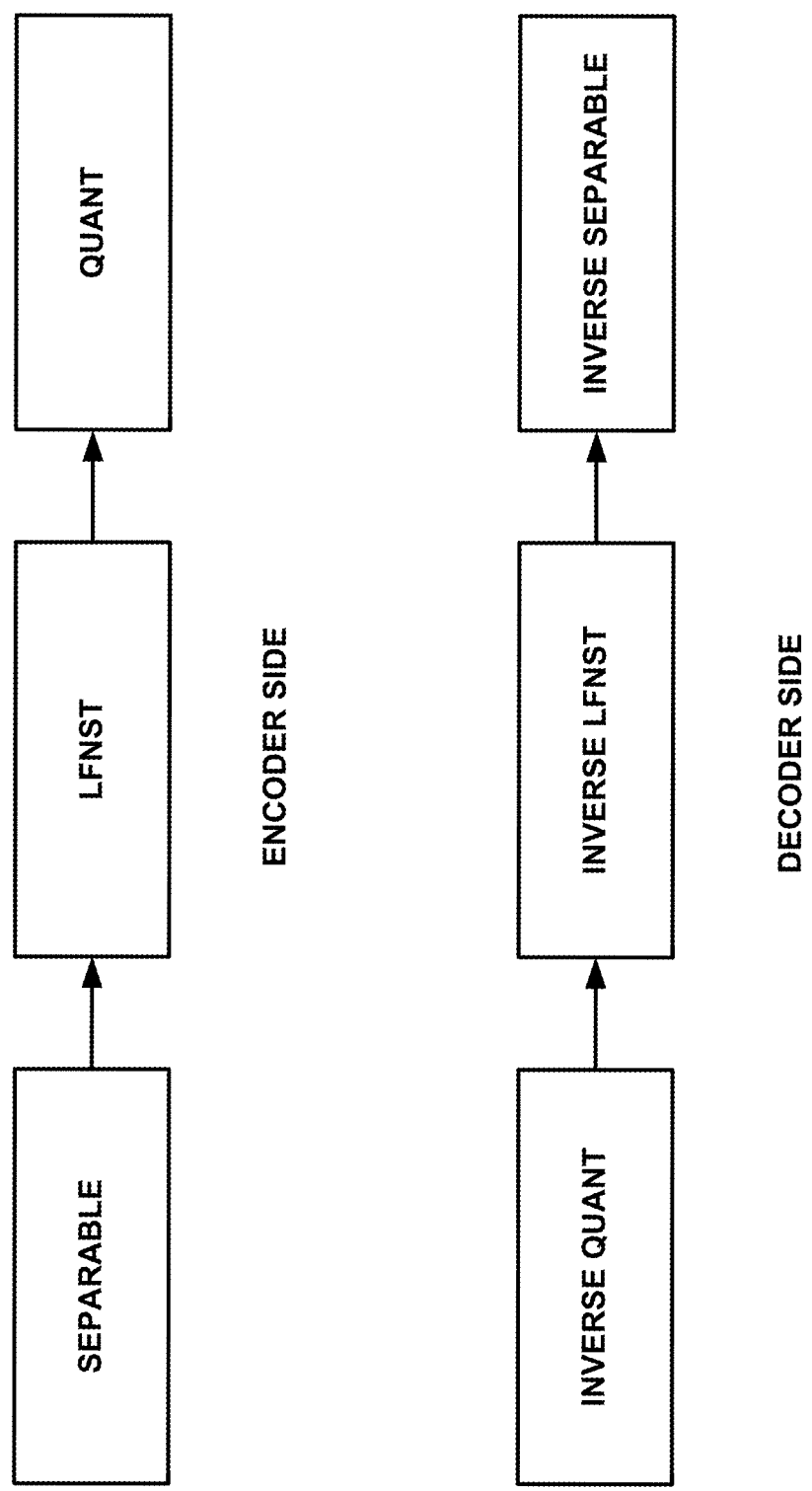
FIG. 5 is a conceptual diagram illustrating a Low-Frequency Non-Separable Transformation (LFNST) on a video encoder and a video decoder.

FIG. 5 is a conceptual diagram illustrating an example of a Low-Frequency Non-Separable Transformation (LFNST) on a video encoder (e.g., video encoder 200) and a video decoder (e.g., video decoder 300). In the example of FIG. 5, the LFNST is introduced as a stage between the separable transformation and quantization on the video encoder and between inverse quantization and inverse transformation (an inverse LFNST) on the video decoder. For example, video encoder 200 may include the example LFNST of FIG. 5 and video decoder 300 may include the example inverse LFNST of FIG. 5. LFNST, as illustrated in FIG. 5, is used in JEM-7.0 to further improve the coding efficiency of MTS, where an implementation of LFNST is based on an example Hyper-Cube Givens Transform (HyGT) described in U.S. Pat. No. 10,448,053, issued on Oct. 15, 2019. U.S. Pat. No. 10,491,922, issued on Nov. 26, 2019, U.S. Pat. No. 10,349,085, issued on Jul. 9, 2019, and U.S. Patent Publication No. 2019/0297351-A1, published on Sep. 26, 2019 describe other example designs and further details. Additionally, LFNST has been adopted in the VVC standard. See Koo et al., "CE6: Reduced Secondary Transform (RST) (CE6-3.1)," Joint Video Experts Team (WET) of ITU-T SG 16 WP 3 and ISO/IEC JTC 1/SC 29/WG 11, 14$^{th}$ Meeting: Geneva, CH, 1-11 Oct. 2019, JVET-N0193. It should be noted that LFNST was previously called non-separable secondary transform (NSST) or a secondary transform using the same abbreviation. An LFNST may be used to compresses redundancies in low-frequency primary transform coefficients. The LFNST may be said to be non-separable because the LFNST involves matrix multiplication and does not lend itself to being implemented using more than one iteration.

Figure 6:
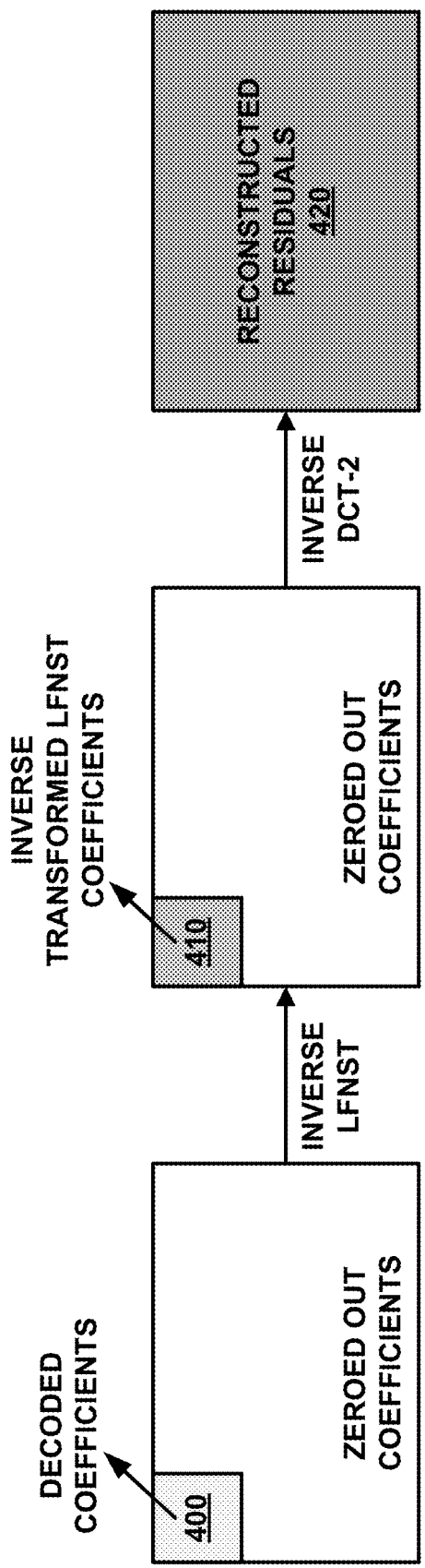
FIG. 6 is a block diagram illustrating an example of inverse transform techniques when LFNST is used.

A decoding process using LFNST is now described. FIG. 6 is a block diagram illustrating an example of inverse transform techniques when LFNST is used. For example, video decoder 300 may employ the inverse transform process of FIG. 6. The inverse transformation techniques with LFNST involves following steps as illustrated in FIG. 6.

For example, video decoder 300 may use the decoded transform coefficients (subblock 400) as input to the inverse LFNST by first converting the 2-D block into a 1-D list (or vector) of coefficients via pre-defined scanning/ordering. Video decoder 300 may apply an inverse LFNST to the 1-D list of input coefficients to decompress the redundancies in the low-frequency primary transform coefficients and reorganize the output coefficients into a 2-D block via pre-defined scanning/ordering (subblock 410). Video decoder 300 may use the inverse transformed LFNST coefficients as input to the separable inverse DCT-2 to obtain reconstructed residuals 420.

In VVC Draft 8, LFNST may be applied to 4×4 and 8×8 subblocks. For example, video encoder 200 may apply LFNST to 4×4 and 8×8 subblocks or video decoder 300 may apply an inverse LFNST to 4×4 and 8×8 subblocks. For video decoder 300, in both cases of 4×4 subblocks and 8×8 subblocks, 16 decoded coefficients in a 4×4 subblock (some of which may be normatively zeroed-out) are input to an inverse LFNST.

Figure 7:
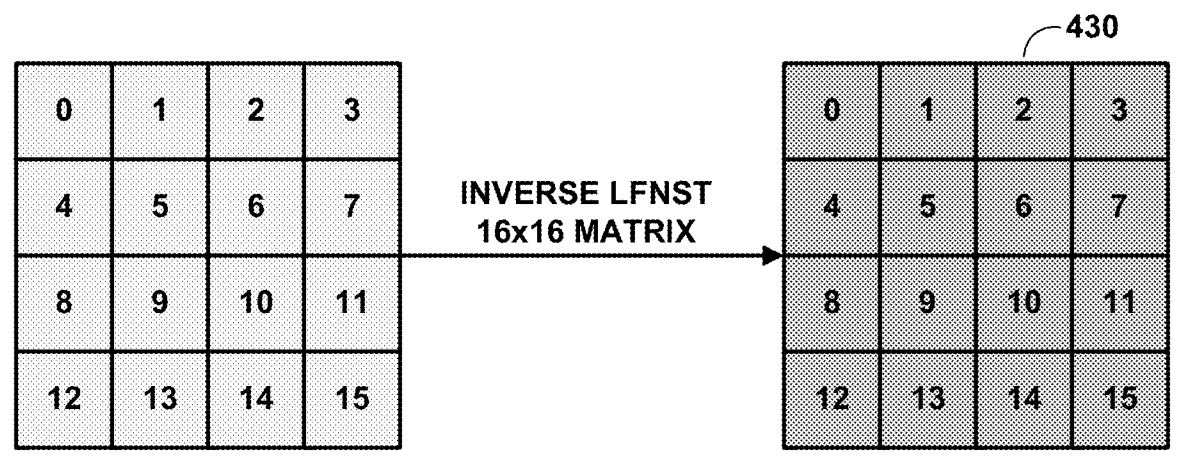

FIG. 7 is a conceptual diagram of a 4×4 inverse LFNST used to reconstruct 16 intermediate coefficients from a list of 16 input coefficients. For the 4×4 case, a 16×16 inverse LFNST is used to construct 16 intermediate coefficients 430 before the separable inverse DCT-2 as shown in FIG. 7.

Figure 8:
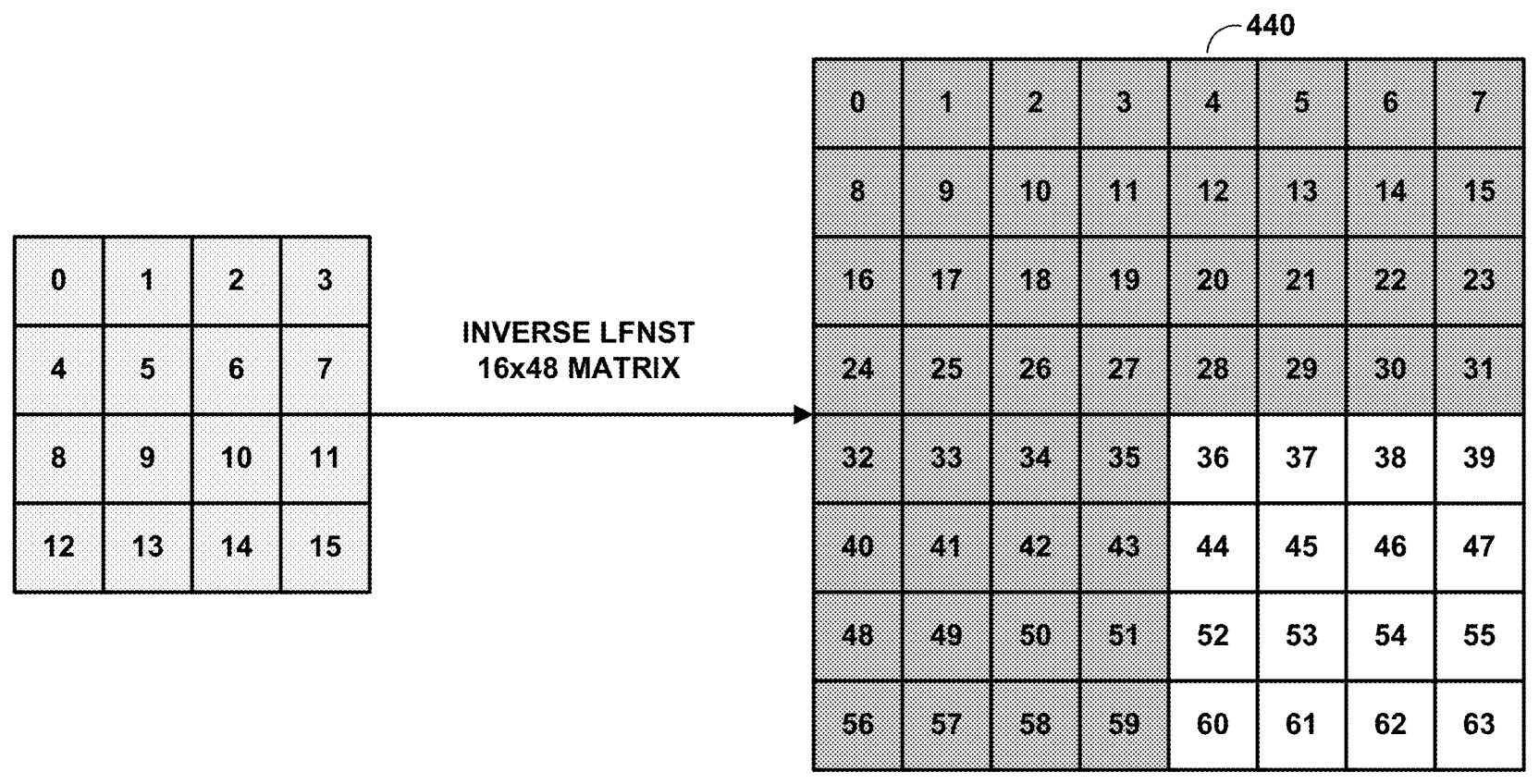

FIG. 8 is a conceptual diagram of an 8×8 inverse LFNST used to reconstruct 48 intermediate coefficients from a list of 16 input coefficients. For the 8×8 subblock case, video decoder 300 may use a 16×48 inverse LFNST to construct 48 intermediate coefficients 440 before applying the separable inverse DCT-2 as shown in FIG. 8. The use of 48 intermediate coefficients may reduce the number of multiplications so as to reduce complexity. Note that 48 intermediate coefficients are reorganized in an L-shaped pattern.

An inverse LFNST processes can be fully defined based on (i) a transform (e.g., LFNST) matrix and (ii) a reorganization pattern/scan for intermediate coefficients. The details of the zero-out process in the VVC Draft 8 are discussed in U.S. Patent Publication No. 2020-0366937 A1, published on Nov. 19, 2020.

For a 4×4 LFNST, the following two patterns/scans are used depending on intra mode:

const int g_lfnstRGScan4×4 [16]=

{//0 1 2 3 4 5 6 7 8 9 10 11 12 13 14 15

0, 1, 2, 3, 4, 5, 6, 7, 8, 9, 10, 11, 12, 13, 14, 15

};

const int g_lfnstRGTranScan4×4[16]=

{//0 1 2 3 4 5 6 7 8 9 10 11 12 13 14 15

0, 4, 8, 12, 1, 5, 9, 13, 2, 6, 10, 14, 3, 7, 11, 15

};

where above two patterns/scans indicate the reordering of intermediate coefficients. For example, g_lfnstRGScan4×4 does not change the row or perform a major reordering of coefficients. However, lfnstRGTranScan4×4 reorders the coefficients by transposing the order of coefficients (e.g., coefficients at 1, 2, 3, 6, 7 and 11 are swapped with coefficients at 4, 8, 12, 9, 13 and 14, respectively).

For a 4×4 LFNST, eight 16×16 matrices are used as candidates according to VVC Draft 8, which are also listed in Section 8.7.4.3 of Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6").

For an 8×8 LFNST, the following two patterns/scans are used depending on intra mode:

const int g_lfnstRGScan8×8 [48]=

{//0 1 2 3 4 5 6 7 8 9 10 11 12 13 14 15 16 17 18 19 20 21 22 23 24 25 26 27 28 29 30 31 32 33 34 35 36 37 38 39 40 41 42 43 44 45 46 47

0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 40, 41, 42, 43, 48, 49, 50, 51, 56, 57, 58, 59

};

```
const int g_lfnstRGTranScan8x8[48]=
{//0 1 2 3 4 5 6 7 8 9 10 11 12 13 14 15 16 17 18 19 20 21
22 23 24 25 26 27 28 29 30 31 32 33 34 35 36 37 38 39 40
41 42 43 44 45 46 47
0, 8, 16, 24, 32, 40, 48, 56, 1, 9, 17, 25, 33, 41, 49, 57, 2,
10, 18, 26, 34, 42, 50, 58, 3, 11, 19, 27, 35, 43, 51, 59, 4, 12,
20, 28, 5, 13, 21, 29, 6, 14, 22, 30, 7, 15, 23, 31
};
```
where above two patterns/scans indicate the reordering of intermediate coefficients. Specifically, g_lfnstRGScan8x8 reorganizes 48 intermediate coefficients in the L-shaped pattern (e.g., the 48th coefficient is mapped to location 59 in FIG. 8). The scan lfnstRGTranScan4x4 reorders the L-shaped pattern by transposing coefficients (e.g., the 48th coefficient is mapped to location 31 in FIG. 8).

For 8×8 LFNST, eight 16×48 matrices are used as candidates in VVC Draft 8, which are also listed in Section 8.7.4.3 of VVC Draft 6.

H. E. Egilmez, A. Nalci, M. Coban, V. Seregin, M. Karczewicz, "Chroma LFNST Simplification and Signaling," JVET-Q0686, ISO/IEC JTC 1/SC 29/WG 11 Joint Video Exploration Team (WET) 17th Meeting, Brussels, BE, 7-17 Jan. 2020 (with reference software VTM-8.0) discusses only applying an LFNST to luma components and disabling LFNST for chroma components in single tree partition mode. This disabling of LFNST for chroma components in single tree partition mode is also disclosed in U.S. patent application Ser. No. 17/029,416, filed Sep. 23, 2020, claiming priority to U.S. Provisional Patent Application No. 62/906,671, filed on Sep. 26, 2019. In single tree partition mode, there is a case that an LFNST index may be unnecessarily signaled, as described in more detail. This disclosure describes removing this case of unnecessary signaling of the LFNST index. The LFNST index may be based on the position of the last non-zero coefficient of the TU and, when necessary and signaled by video encoder 200, may be used by video decoder 300 to determine whether to apply an inverse LFNST and if an inverse LFNST is to be applied to determine which inverse LFNST to apply. For example, an LFNST index value of 0 may indicate that an inverse LFNST is not to be applied, an LFNST index value of 1 may indicate that a first candidate inverse LFNST is to be applied, and an LFNST index value of 2 may indicate that a second candidate inverse LFNST is to be applied.

According to VVC Draft 8, a video encoder, such as video encoder 200, signals the LFNST index (lfnst_idx) after residual coding of all color components based on the following set of conditions:

```
LfnstDcOnly = 1
LfnstZeroOutSigCoeffFlag = 1
MtsDcOnly = 1
MtsZeroOutSigCoeffFlag = 1
transform_tree( x0, y0, cbWidth, cbHeight, treeType, chType )
...
lfnstNotTsFlag = ( treeType = = DUAL_TREE_CHROMA ||
    transform_skip_flag[ x0 ][ y0 ][ 0 ] = = 0 ) &&
                                                        ( treeType
= = DUAL_TREE_LUMA ||
                                                                (
transform_skip_flag[ x0 ][ y0 ][ 1 ] = = 0 &&
transform_skip_flag[ x0 ][ y0 ][ 2 ] = = 0 ) )
            if( Min( lfnstWidth, lfnstHeight ) >= 4 &&
sps_lfnst_enabled_flag = = 1 &&
                            CuPredMode[ chType ][ x0 ][ y0 ] = =
MODE_INTRA && lfnstNotTsFlag = = 1 &&
                            ( treeType = = DUAL_TREE_CHROMA ||
!intra_mip_flag[ x0 ][ y0 ] ||
                            Min( lfnstWidth, lfnstHeight ) >= 16 )
&&
                    Max( cbWidth, cbHeight ) <= MaxTbSizeY) {
                        if( ( IntraSubPartitionsSplitType != ISP_NO_SPLIT ||
LfnstDcOnly = = 0 ) &&
                                LfnstZeroOutSigCoeffFlag = = 1 )
                        lfnst_idx                                    ae(v)
``` where the LfnstDcOnly variable is used to check if there is a non-DC coefficient in a TU. If there is at least one non-DC coefficient (e.g., LfnstDcOnly is equal to 0), the LFNST index may be signaled.

However, according to VVC Draft 8, the value of LfnstDcOnly depends on chroma components even though LFNST is disabled for chroma in single tree partitioning mode. This issue may lead to unnecessarily checking to determine whether a chroma component includes any non-DC coefficients and unnecessary signaling of an LFNST index when there is no non-DC coefficient in a luma component and there is a non-DC coefficient in chroma components, thus signaling an LFNST index that will not be used. This unnecessary signaling negatively impacts signaling overhead. That is, if a chroma component includes a non-DC coefficient, and single tree partitioning mode is enabled, then video encoder 200 may signal an LFNST index because there is a non-DC coefficient in the chroma component, even though LFNST is disabled because LFSNT is disabled for chroma in single tree partitioning mode.

The following portion of VVC Draft 8 shows the conditions where the LfnstDcOnly flag is updated:

| Descriptor |
|---|
| residual_coding( x0, y0, log2TbWidth, log2TbHeight, cIdx ) {<br>  ...<br>    if( lastSubBlock = = 0 && log2TbWidth >= 2 && log2TbHeight >= 2 &&<br>              !transform_skip_flag[ x0 ][ y0 ][ cIdx ] && lastScanPos > 0 )<br>      LfnstDcOnly = 0<br>    if( ( lastSubBlock > 0 && log2TbWidth >= 2 && log2TbHeight >= 2 ) ||<br>              ( lastScanPos > 7 && ( log2TbWidth = = 2 || log2TbWidth = = 3 ) &&<br>              log2TbWidth = = log2TbHeight ) )<br>      LfnstZeroOutSigCoeffFlag = 0<br>    if( ( lastSubBlock > 0 || lastScanPos > 0 ) && cIdx = = 0 )<br>      MtsDcOnly = 0<br>  ... |

This disclosure describes removing the unnecessary signaling of an LFNST index by adding the following condition to VVC Draft 8. The beginning of the condition is marked by <ADD> and the end of the condition is marked with </ADD> below. This condition may cause a video codec, such as video encoder 200 or video decoder 300, to skip the checking of DC-coefficients for chroma components in the single tree partitioning mode, so that the DC-coefficient check may only be performed for the luma component. For example, video encoder 200 or video decoder 300 may not check DC coefficients for chroma components in single tree partitioning mode.

| Descriptor |
|---|
| residual_coding( x0, y0, log2TbWidth, log2TbHeight, cIdx ) {<br>  ...<br>    <ADD> if( treeType != SINGLE_TREE || cIdx = = 0 ) { </ADD><br>    if( lastSubBlock = = 0 && log2TbWidth >= 2 && log2TbHeight >= 2 &&<br>              !transform_skip_flag[ x0 ][ y0 ][ cIdx ] && lastScanPos > 0 )<br>      LfnstDcOnly = 0<br>  <ADD> } </ADD><br>    if( ( lastSubBlock > 0 && log2TbWidth >= 2 && log2TbHeight >= 2 ) ||<br>              ( lastScanPos > 7 && ( log2TbWidth = = 2 || log2TbWidth = = 3 ) &&<br>              log2TbWidth = = log2TbHeight ) )<br>      LfnstZeroOutSigCoeffFlag = 0<br>    if( ( lastSubBlock > 0 || lastScanPos > 0 ) && cIdx = = 0 )<br>      MtsDcOnly = 0<br>  ... | where updating the variable LfnstDcOnly is allowed if the partitioning mode is not single tree (<ADD>treeType !=SINGLE_TREE</ADD>) or the currently processed TB is from the luma component (<ADD>cIdx==0</ADD>). The addition of this condition may remove the case of unnecessary signaling of the LFNST index in VVC Draft 8 and reduce the signaling overhead through video encoder 200 not signaling an LFNST index that may not be used by video decoder 300.

Figure 9:
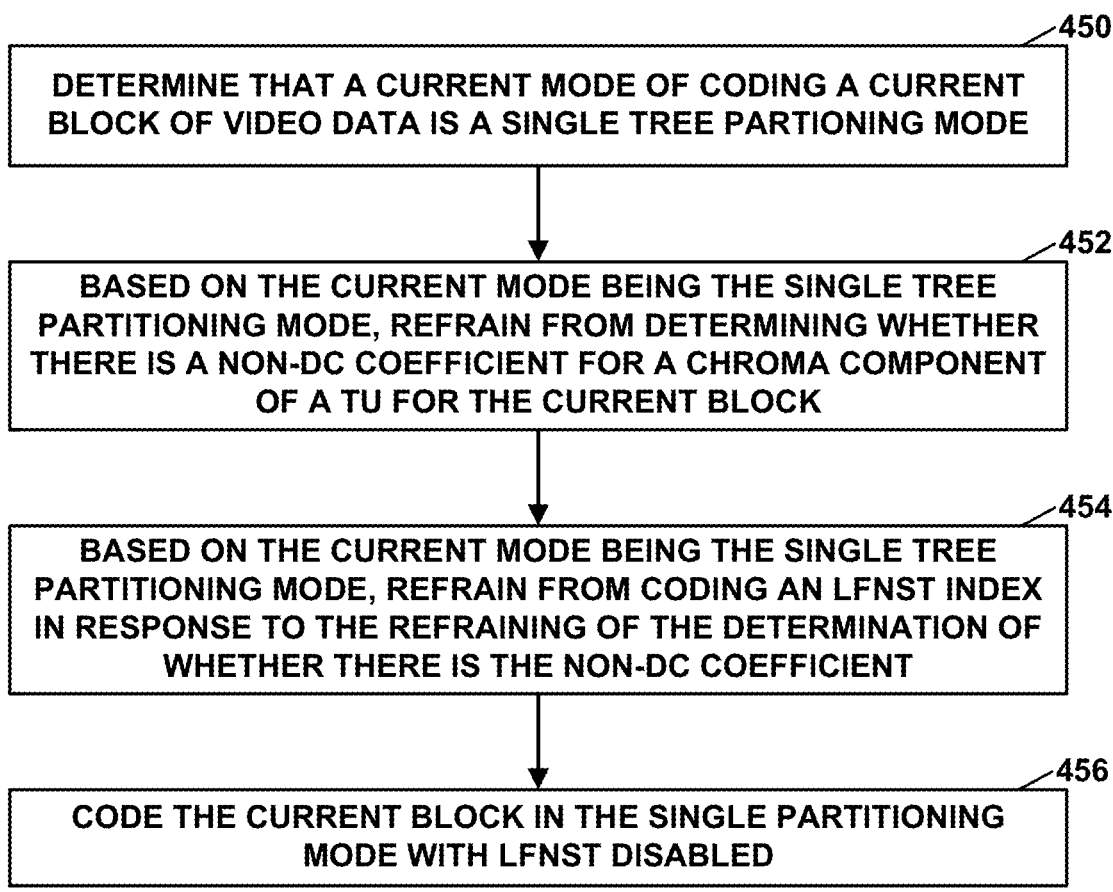
FIG. 9 is a flowchart illustrating example techniques for LFNST coding according to this disclosure.

FIG. 9 is a flowchart illustrating example techniques for LFNST coding according to this disclosure. Video encoder 200 or video decoder 300 may determine that a current mode of coding a current block of the video data is a single tree partitioning mode (450). For example, video encoder 200 may test various coding modes and perform rate distortion checks to determine that the current mode of coding the current block is a single tree partitioning mode and signal a syntax element indicative of the current mode being single tree partitioning mode. Video decoder 300 may parse the syntax element to determine that the current mode is single tree partitioning mode.

Based on the current mode being the single tree partitioning mode, video encoder 200 or video decoder 300 may refrain from determining whether there is a non-DC coefficient for a chroma component of a TU for the current block (452). For example, video encoder 200 may not check whether there is a non-DC coefficient for the chroma component of the TU and may not update a variable, such as LfnstDcOnly, based on whether there is a non-DC coefficient for the chroma component of the TU. Video decoder 300 may not check whether there is a non-DC coefficient for the chroma component of the TU and may not update the variable, such as LfnstDcOnly, even if there is one or more non-DC component for the chroma component of the TU.

Also, based on the current mode being the single tree partitioning mode, video encoder 200 or video decoder 300 may refrain from coding an LFNST index in response to the refraining of the determination of whether there is the non-DC coefficient (454). For example, video encoder 200 may not encode the LFNST index and video decoder 300 may not decode the LFNST index.

Video encoder 200 or video decoder 300 may code the current block in the single partitioning mode with LFNST disabled (456). For example, video encoder 200 may encode the current block using single tree partitioning mode without applying an LFNST or video decoder 300 may decode the current block using single tree partitioning mode without applying an inverse LFNST. In some examples, the chroma component includes a non-DC coefficient.

In some examples, the current mode is a first mode and the current block is a first block. In such examples, video encoder 200 or video decoder 300 may determine that a second mode for coding a second block of the video data is not a single tree partitioning mode. Based on the second mode not being the single tree partitioning mode, video encoder 200 or video decoder 300 may determine whether there is a non-DC coefficient for a chroma component of a TU for the second block. Also, based on the second mode not being the single tree partitioning mode, video encoder 200 or video decoder 300 may code an LFNST index for the second block in response to there being the non-DC coefficient for the chroma component of the TU for the second block. Video encoder 200 or video decoder 300 may code the second block based on current mode and the determination of whether there is the non-DC coefficient for the chroma component. For example, if there is a non-DC coefficient for the chroma component, video encoder 200 may update a variable, such as LfnstDcOnly, that indicates that there is a non-DC coefficient for the chroma component, signal an LFNST index, and encode the second block using an LFNST. Video decoder 300 may parse the LFNST index and decode the second block using an inverse-LFNST based on the LFNST index.

In some examples, video encoder 200 or video decoder 300 may determine whether there is a non-DC coefficient for a luma component of a TU for the current block. In some examples, coding includes encoding (e.g., by video encoder 200) and there is no non-DC coefficient for the luma component. In such examples, video encoder 200 may, based on there being no non-DC coefficient for the luma component, refrain from signaling an LFNST index for the current block. For example, video encoder 200 may refrain from signaling an LFNST index for the current block further based on there being no non-DC coefficient for the luma component. In some examples, video encoder 200 may, based on the determination of whether there is the non-DC coefficient for the luma component, set a value of a variable (e.g., LfnstDcOnly) to be indicative of whether there is the non-DC coefficient of the luma component.

In some examples, video encoder 200 may, based on the current mode being the single tree partitioning mode, refrain from updating the variable to be indicative of whether there is the non-DC coefficient for the chroma component. For example, video encoder 200 may determine that there are no non-DC coefficients for the luma component of the current TU and set the value of LfnstDcOnly to 1. Video encoder 200 may determine the current mode is single tree partitioning mode. Based on the current mode being single tree partitioning mode, video encoder 200 may not update the value of LfnstDcOnly to 0 even if there are non-DC coefficients for a chroma component of the current TU.

In some examples, coding includes decoding (e.g., by video decoder 300) and determining whether there is a non-DC coefficient for a luma component of a TU for the current block includes determining a value of a variable indicative of whether there is the non-DC coefficient for the luma component. For example, video decoder 300 may use the value of LfnstDcOnly to determine whether there is a non-DC coefficient for the luma component of the TU of the current block.

In some examples, source device 102 may include a camera (e.g., video source 104) configured to capture video data. In some examples, destination device may include display device 118 configured to display video data.

Figure 10:
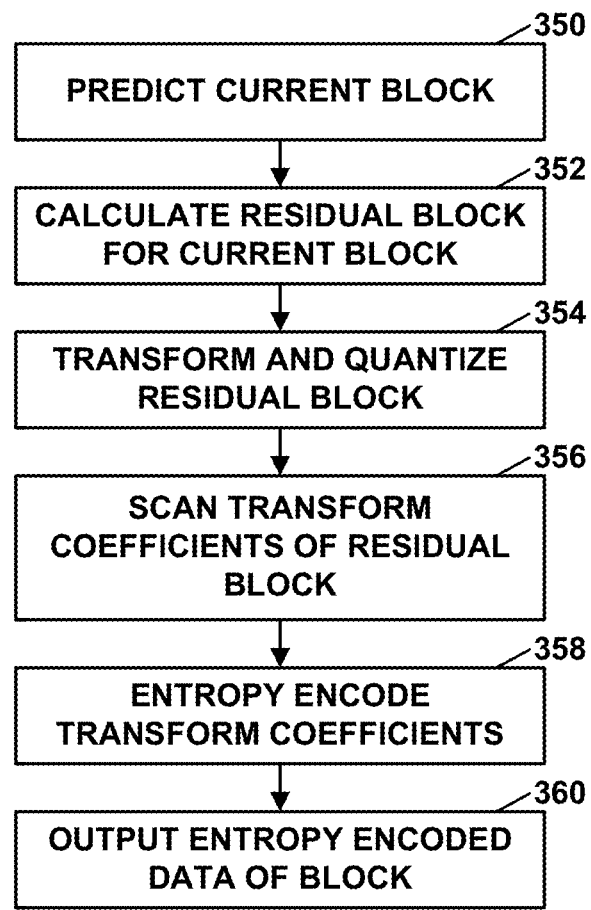
FIG. 10 is a flowchart illustrating example techniques of video encoding.

FIG. 10 is a flowchart illustrating an example method for encoding a current block. The current block may comprise a current CU. Although described with respect to video encoder 200 (FIGS. 1 and 3), it should be understood that other devices may be configured to perform a method similar to that of FIG. 10.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). In some examples, as part of transforming the residual block, video encoder 200 may perform the techniques of FIG. 9. Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 11:
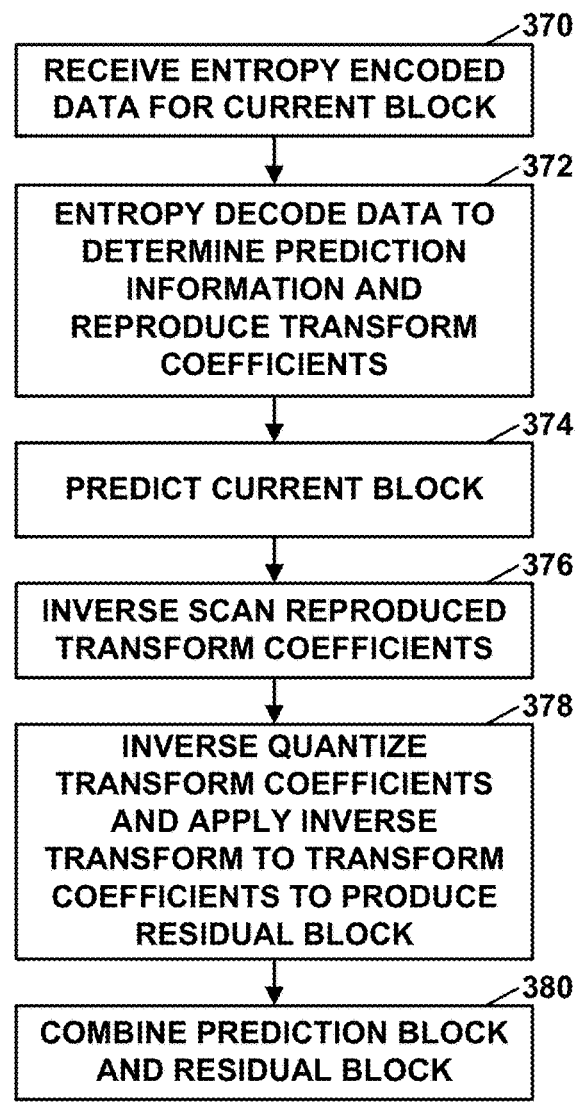
FIG. 11 is a flowchart illustrating example techniques of video decoding.

FIG. 11 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 11.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). In some examples, as part of applying the invers transform, video decoder 300 may perform the techniques of FIG. 9. Video decoder 300 may ultimately decode the current block by combining the prediction block and the residual block (380).

According to the techniques of this disclosure, by refraining from checking whether a chroma component of a TU has non-DC coefficients when a block is coded in single tree partitioning mode, a video coder may reduce the use of processing power. Additionally, a video encoder may reduce signaling overhead by not signaling an LFNST index if there are no non-DC coefficients for a luma component of the TU in a single tree partitioning mode.

This disclosure includes the following examples.

Clause 1A. A method of coding video data, the method comprising: determining whether a current mode is a single tree partitioning mode; based on the current mode not being the single tree partitioning mode, determining whether there is a non-DC coefficient for a chroma component; and coding the video data based on current mode and the determination of whether there is the non-DC coefficient for the chroma component.

Clause 2A. A method of coding video data, the method comprising: determining whether a current mode is a single tree partitioning mode; based on the current mode being the single tree partitioning mode, refrain from determining whether there is a non-DC coefficient for a chroma component; and coding the video data based on the current mode without the determination of whether there is the non-DC coefficient for the chroma component.

Clause 3A. The method of clause 2A, further comprising not updating LfnstDcOnly for a current block of video data based on the current mode being the single tree partitioning mode.

Clause 4A. A method of coding video data, the method comprising: for a first instance of the video data: determining whether a current mode in the first instance is a single tree partitioning mode; based on the current mode in the first instance not being the single tree portioning mode, determining whether there is a non-DC coefficient for a chroma component; and coding the video data in the first instance based on current mode and the determination of whether there is the non-DC coefficient for the chroma component; and for a second instance of the video data: determining whether a current mode in the second instance is the single tree partitioning mode; based on the current mode in the second instance being the single tree partitioning mode, refrain from determining whether there is a non-DC coefficient for a chroma component; and coding the video data in the second instance based on the current mode without the determination of whether there is the non-DC coefficient for the chroma component.

Clause 5A. The method of any of clauses 1A-4A, wherein coding comprises decoding.

Clause 6A. The method of any of clauses 1A-5A, wherein coding comprises encoding.

Clause 7A. A device for coding video data, the device comprising one or more means for performing the method of any of clauses 1A-6A.

Clause 8A. The device of clause 7A, wherein the one or more means comprise one or more processors implemented in circuitry.

Clause 9A. The device of any of clauses 7A and 8A, further comprising a memory to store the video data.

Clause 10A. The device of any of clauses 7A-9A, further comprising a display configured to display decoded video data.

Clause 11A. The device of any of clauses 7A-10A, wherein the device comprises one or more of a camera, a computer, a mobile device, a broadcast receiver device, or a set-top box.

Clause 12A. The device of any of clauses 7A-11A, wherein the device comprises a video decoder.

Clause 13A. The device of any of clauses 7A-12A, wherein the device comprises a video encoder.

Clause 14A. A computer-readable storage medium having stored thereon instructions that, when executed, cause one or more processors to perform the method of any of clauses 1A-6A.

Clause 15A. A device for encoding video data, the device comprising: means for determining whether a current mode is a single tree partitioning mode; based on the current mode not being the single tree portioning mode, means determining whether there is a non-DC coefficient for a chroma component; and means for encoding the video data based on current mode.

Clause 16A. A device for encoding video data, the device comprising: means determining whether a current mode is a single tree partitioning mode; based on the current mode being the single tree partitioning mode, means for refraining from determining whether there is a non-DC coefficient for a chroma component; and means for encoding the video data based on the current mode.

Clause 17A. The device comprising a combination of clauses 15A and 16A, wherein the video data of clause 15A is a first instance of the video data, and the video data of clause 16A is a second instance of the video data.

Clause 1B. A method of coding video data, the method comprising: determining that a current mode of coding a current block of the video data is a single tree partitioning mode; based on the current mode being the single tree partitioning mode: Refraining from determining whether there is a non-DC coefficient for a chroma component of a transform unit (TU) for the current block; and refraining from coding a low-frequency non-separable transformation (LFNST) index in response to the refraining of the determination of whether there is the non-DC coefficient; and coding the current block in the single partitioning mode with LFNST disabled.

Clause 2B. The method of clause 1B, wherein the chroma component comprises a non-DC coefficient.

Clause 3B. The method of clauses 1B or 2B, wherein the current mode is a first mode and the current block is a first block, the method further comprising: determining that a second mode for coding a second block of the video data is not a single tree partitioning mode; based on the second mode not being the single tree partitioning mode: determining that there is a non-DC coefficient for a chroma component of a TU for the second block; and coding an LFNST index for the second block in response to there being the non-DC coefficient for the chroma component of the TU for the second block; and coding the second block based on the second mode and with the LFNST index.

Clause 4B. The method of any combination of clauses 1B-3B, further comprising: determining whether there is a non-DC coefficient for a luma component of the TU for the current block.

Clause 5B. The method of clause 4B, wherein coding comprises encoding and wherein there is no non-DC coefficient for the luma component, and wherein refraining from signaling the LFNST index for the current block is further based on there being no non-DC coefficient for the luma component.

Clause 6B. The method of clauses 4B or 5B, wherein coding comprises encoding, the method further comprising: based on the determination of whether there is the non-DC coefficient for the luma component, setting a value of a variable to be indicative of whether there is the non-DC coefficient of the luma component.

Clause 7B. The method of clause 6B, further comprising: based on the current mode being the single tree partitioning mode, refraining from updating the variable to be indicative of whether there is the non-DC coefficient for the chroma component.

Clause 8B. The method of clause 4B, wherein coding comprises decoding and wherein determining whether there is a non-DC coefficient for a luma component of a TU for the current block comprises: determining a value of a variable indicative of whether there is the non-DC coefficient for the luma component.

Clause 9B. A device for coding video data, the device comprising: memory configured to store the video data; and one or more processors implemented in circuitry and communicatively coupled to the memory, the one or more processors being configured to: determine that a current mode of coding a current block of the video data is a single tree partitioning mode; based on the current mode being the single tree partitioning mode: refrain from determining whether there is a non-DC coefficient for a chroma component of a transform unit (TU) for the current block; and refrain from coding a low-frequency non-separable transformation (LFNST) index in response to the refraining of the determination of whether there is the non-DC coefficient; and code the current block in the single partitioning mode with LFNST disabled.

Clause 10B. The device of clause 9B, wherein the chroma component comprises a non-DC coefficient.

Clause 11B. The device of clauses 9B or 10B, wherein the current mode is a first mode and the current block is a first block, the one or more processors being further configured to: determine that a second mode for coding a second block of the video data is not a single tree partitioning mode; based on the second mode not being the single tree partitioning mode: determine that there is a non-DC coefficient for a chroma component of a TU for the second block; and code an LFNST index for the second block based on there being the non-DC coefficient for the chroma component of the TU for the second block; and code the second block based on the second mode and with the LFNST index.

Clause 12B. The device of any combination of clauses 9B-11B, wherein the one or more processors are further configured to: determine whether there is a non-DC coefficient for a luma component of the TU for the current block.

Clause 13B. The device of clause 12B, wherein code comprises encode and wherein there is no non-DC coefficient for the luma component and wherein the one or more processors being refrain from signaling the LFNST index for the current block further based on there being no non-DC coefficient for the luma component.

Clause 14B. The device of clauses 12B or 13B, wherein coding comprises encoding, the one or more processors being further configured to: based on the determination of whether there is the non-DC coefficient for the luma component, set a value of a variable to be indicative of whether there is the non-DC coefficient of the luma component.

Clause 15B. The device of clause 14B, wherein the one or more processors are further configured to: based on the current mode being the single tree partitioning mode, refrain from updating the variable to be indicative of whether there is the non-DC coefficient for the chroma component.

Clause 16B. The device of clause 12B, wherein code comprises decode and wherein as part of determining whether there is a non-DC coefficient for a luma component of a TU for the current block, the one or more processors are configured to: determine a value of a variable indicative of whether there is the non-DC coefficient for the luma component.

Clause 17B. The device of any combination of clauses 9B-16B, further comprising: a camera configured to capture the video data.

Clause 18B. The device of any combination of clauses 9B-17B, further comprising: a display device configured to display the video data.

Clause 19B. A non-transitory computer-readable storage medium storing instructions, which, when executed, cause one or more processors to: determine that a current mode of coding a current block of video data is a single tree partitioning mode; based on the current mode being the single tree partitioning mode: refrain from determining whether there is a non-DC coefficient for a chroma component of a transform unit (TU) for the current block; and refrain from coding a low-frequency non-separable transformation (LFNST) index in response to the refraining of the determination of whether there is the non-DC coefficient; and code the current block in the single partitioning mode with LFNST disabled.

Clause 20B. A device for coding video data, the device comprising: means for determining that a current mode of coding a current block of the video data is a single tree partitioning mode; based on the current mode being the single tree partitioning mode: means for refraining from determining whether there is a non-DC coefficient for a chroma component of a transform unit (TU) for the current block; and means for refraining from coding a low-frequency non-separable transformation (LFNST) index in response to the refraining of the determination of whether there is the non-DC coefficient; and means for coding the current block in the single partitioning mode with LFNST disabled.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining that a current mode of coding a current block of the video data is a single tree partitioning mode;
   based solely on the current mode being the single tree partitioning mode:
      refraining from determining whether there is a non-DC coefficient for a chroma component of a transform unit (TU) for the current block; and
      refraining from coding a low-frequency non-separable transformation (LFNST) index for the chroma component; and
   coding the chroma component with LFNST disabled.

2. The method of claim 1, wherein the chroma component comprises a non-DC coefficient.

3. The method of claim 1, wherein the current mode is a first mode and the current block is a first block, the method further comprising:
   determining that a second mode for coding a second block of the video data is not a single tree partitioning mode;
   based on the second mode not being the single tree partitioning mode:
      determining that there is a non-DC coefficient for a chroma component of a TU for the second block; and
      coding an LFNST index for the second block in response to there being the non-DC coefficient for the chroma component of the TU for the second block; and
   coding the second block based on the second mode and with the LFNST index.

4. The method of claim 1, further comprising:
   determining whether there is a non-DC coefficient for a luma component of the TU for the current block.

5. The method of claim 4, wherein coding comprises encoding and wherein there is no non-DC coefficient for the luma component, wherein the method further comprises refraining from signaling an LFNST index for the luma component based on there being no non-DC coefficient for the luma component.

6. The method of claim 4, wherein coding comprises encoding, the method further comprising:
   based on the determination of whether there is the non-DC coefficient for the luma component, setting a value of a variable to be indicative of whether there is the non-DC coefficient of the luma component.

7. The method of claim 6, further comprising:
   based on the current mode being the single tree partitioning mode, refraining from updating the variable to be indicative of whether there is the non-DC coefficient for the chroma component.

8. The method of claim 4, wherein coding comprises decoding and wherein determining whether there is the non-DC coefficient for the luma component of the TU for the current block comprises:
   determining a value of a variable indicative of whether there is the non-DC coefficient for the luma component.

9. A device for coding video data, the device comprising:
   memory configured to store the video data; and
   one or more processors implemented in circuitry and communicatively coupled to the memory, the one or more processors being configured to:
      determine that a current mode of coding a current block of the video data is a single tree partitioning mode;
      based solely on the current mode being the single tree partitioning mode:
         refrain from determining whether there is a non-DC coefficient for a chroma component of a transform unit (TU) for the current block; and
         refrain from coding a low-frequency non-separable transformation (LFNST) index for the chroma component; and
      code the chroma component with LFNST disabled.

10. The device of claim 9, wherein the chroma component comprises a non-DC coefficient.

11. The device of claim 9, wherein the current mode is a first mode and the current block is a first block, the one or more processors being further configured to:
    determine that a second mode for coding a second block of the video data is not a single tree partitioning mode;
    based on the second mode not being the single tree partitioning mode:
       determine that there is a non-DC coefficient for a chroma component of a TU for the second block; and
       code an LFNST index for the second block based on there being the non-DC coefficient for the chroma component of the TU for the second block; and
       code the second block based on the second mode and with the LFNST index.

12. The device of claim 9, wherein the one or more processors are further configured to:
    determine whether there is a non-DC coefficient for a luma component of the TU for the current block.

13. The device of claim 12, wherein code comprises encode and wherein there is no non-DC coefficient for the luma component and wherein the one or more processors are further configured to refrain from signaling an LFNST index for the luma component based on there being no non-DC coefficient for the luma component.

14. The device of claim 12, wherein coding comprises encoding, the one or more processors being further configured to:
based on the determination of whether there is the non-DC coefficient for the luma component, set a value of a variable to be indicative of whether there is the non-DC coefficient of the luma component.

15. The device of claim 14, wherein the one or more processors are further configured to:
based on the current mode being the single tree partitioning mode, refrain from updating the variable to be indicative of whether there is the non-DC coefficient for the chroma component.

16. The device of claim 12, wherein code comprises decode and wherein as part of determining whether there is the non-DC coefficient for the luma component of the TU for the current block, the one or more processors are configured to:
determine a value of a variable indicative of whether there is the non-DC coefficient for the luma component.

17. The device of claim 9, further comprising:
a camera configured to capture the video data.

18. The device of claim 9, further comprising:
a display device configured to display the video data.

19. A non-transitory computer-readable storage medium storing instructions, which, when executed, cause one or more processors to:
determine that a current mode of coding a current block of video data is a single tree partitioning mode;
based solely on the current mode being the single tree partitioning mode:
refrain from determining whether there is a non-DC coefficient for a chroma component of a transform unit (TU) for the current block; and
refrain from coding a low-frequency non-separable transformation (LFNST) index for the chroma component; and
code the chroma component with LFNST disabled.

20. A device for coding video data, the device comprising:
means for determining that a current mode of coding a current block of the video data is a single tree partitioning mode;
based on the current mode being the single tree partitioning mode:
means for refraining from determining whether there is a non-DC coefficient for a chroma component of a transform unit (TU) for the current block; and
means for refraining from coding a low-frequency non-separable transformation (LFNST) index for the chroma component; and
means for coding the chroma component with LFNST disabled.

* * * * *